July 18, 1950   G. SWIFT ET AL   2,515,745
NEUTRON LOG
Filed April 8, 1949   4 Sheets-Sheet 2
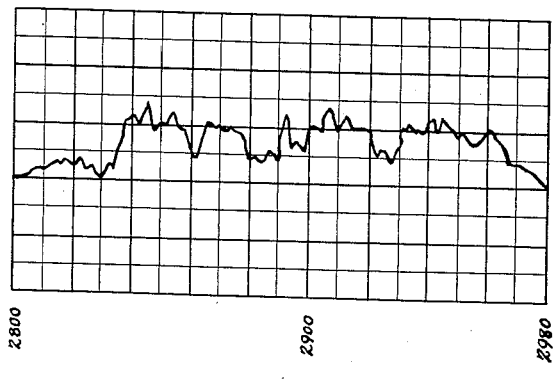
*Fig. 3ᶜ*
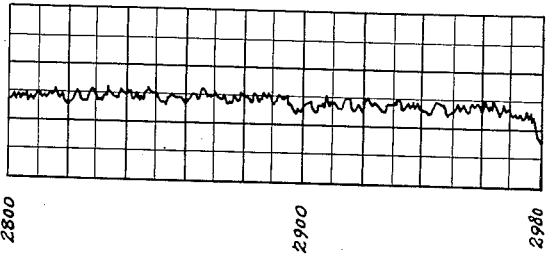
*Fig. 3ᵇ*
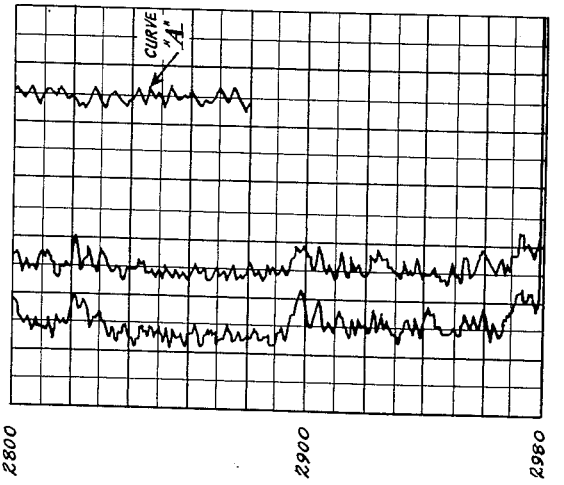
*Fig. 3ᵃ*
INVENTORS
GILBERT SWIFT,
ROBERT E. FEARON and
JEAN M. THAYER
BY James y. Cleveland
ATTORNEY July 18, 1950     G. SWIFT ET AL     2,515,745
NEUTRON LOG
Filed April 8, 1949     4 Sheets-Sheet 3
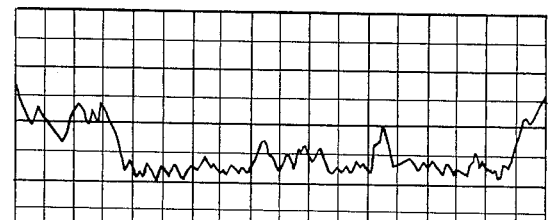
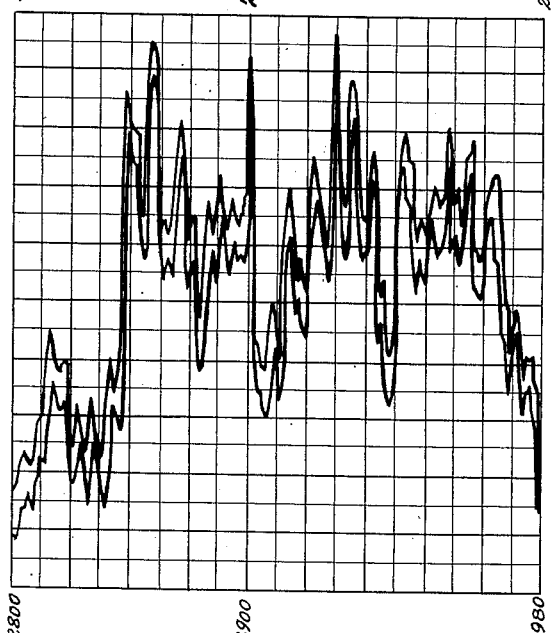
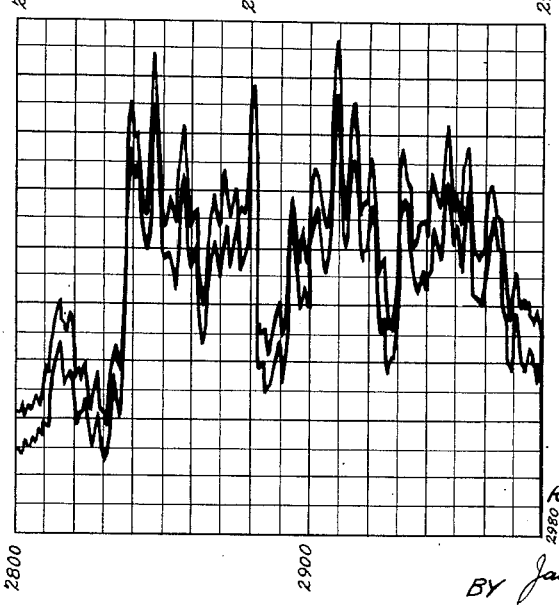
INVENTORS
GILBERT SWIFT,
ROBERT E. FEARON &
JEAN M. THAYER
BY *James Y. Cleveland*
ATTORNEY

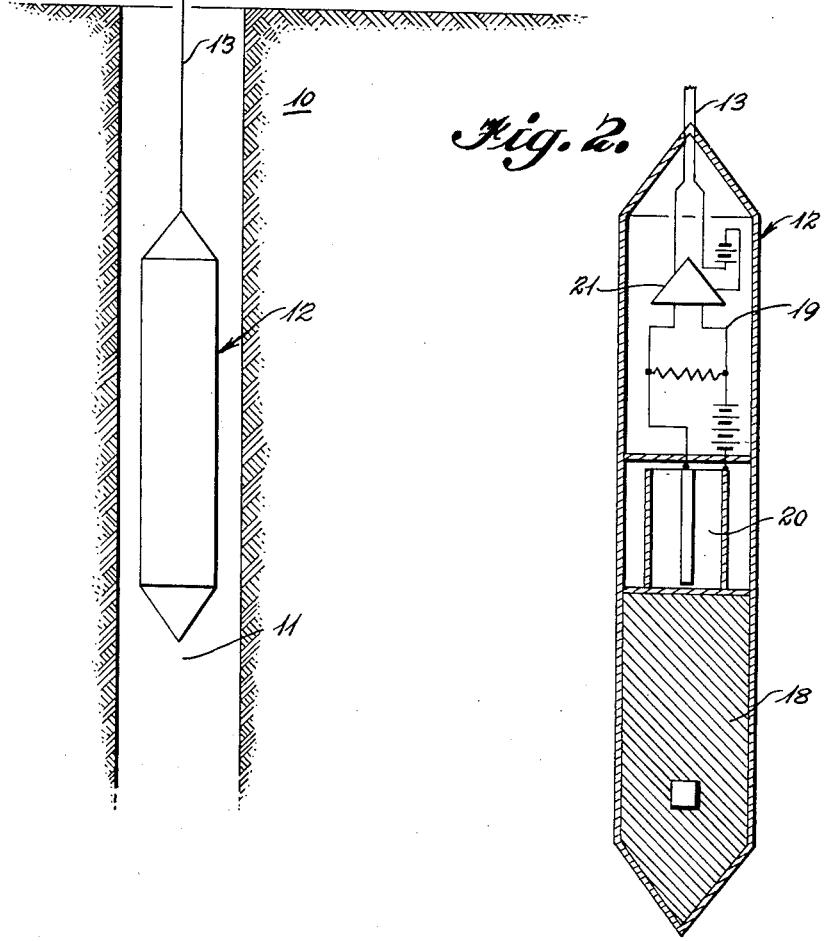

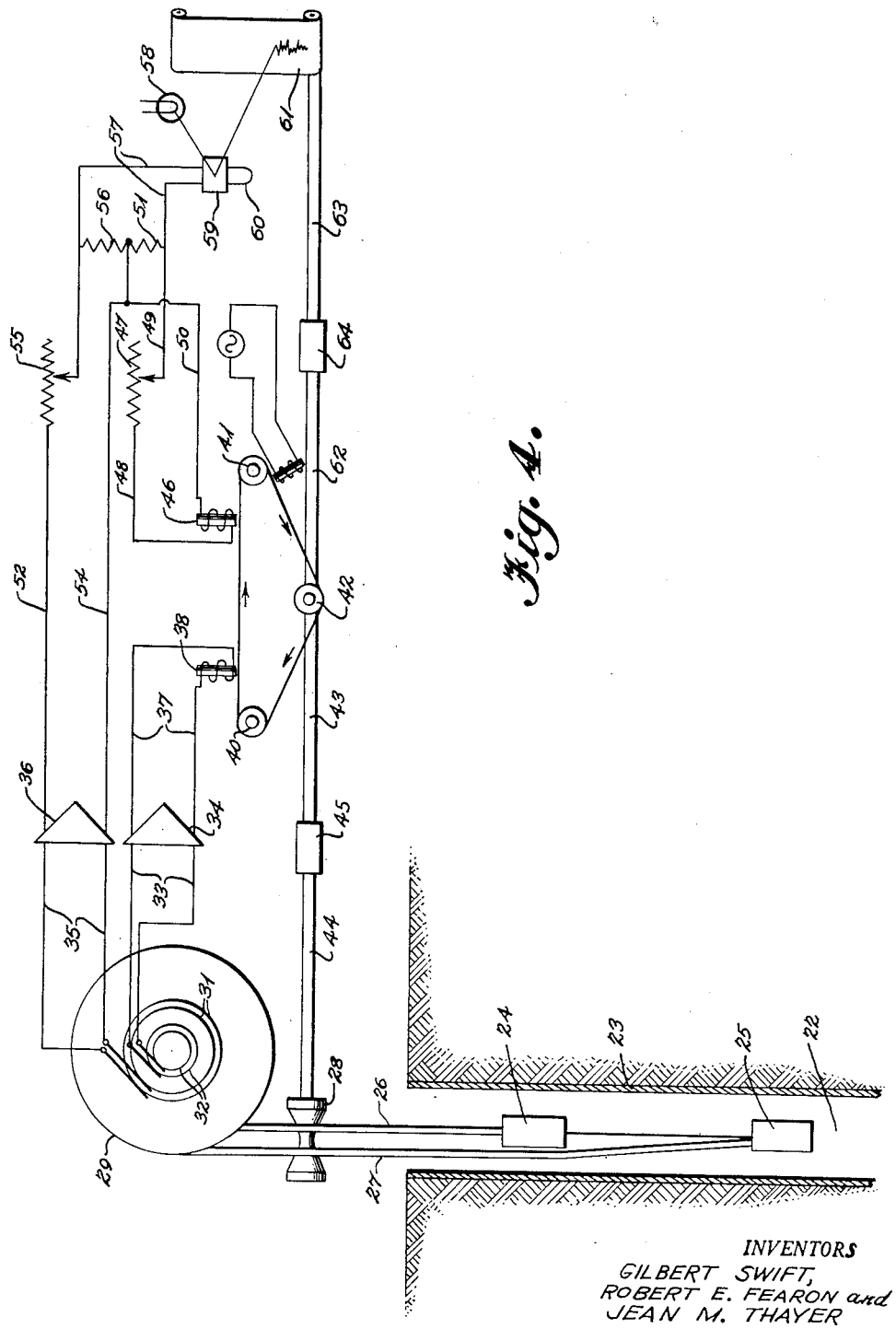

UNITED STATES PATENT OFFICE 2,515,745

NEUTRON LOG

Gilbert Swift, Robert E. Fearon, and Jean M. Thayer, Tulsa, Okla., assignors to Well Surveys, Incorporated, Tulsa, Okla., a corporation of Delaware Application April 8, 1949, Serial No. 86,244

9 Claims. (Cl. 250—83.6)

This invention relates to the art of sub-surface exploration, principally oil well logging, and more particularly to a radioactivity type of exploration in which a source of fast neutrons is used in conjunction with a gamma-ray detector. Commercially such a radioactivity log made by the use of a source of fast neutrons and a gamma-ray detector is known as a neutron log. This is true despite the fact that no neutrons are directly detected.

In recent years neutron oil well logs have achieved a degree of popularity not shared by the logs made by other methods. This is believed to be attributable to the fact that, in a substantial proportion of surveys made, they correlate more accurately with the lithology of the strata penetrated by the well. These logs have been made by traversing the well with a source of neutrons, usually 300 to 500 millicuries of radium intimately mixed with a predominant proportion by weight of powdered beryllium, to irradiate with fast neutrons the strata lining the well and simultaneously traverse the well with an associated gamma-ray detector to detect and record gamma rays in correlation with the depth at which they are detected. The detector, for example an ionization chamber, and the source are assembled to make a single unit, with the detector vertically spaced from the source.

By extensive experimentation we have discovered that the neutron log does not, in many important instances, adequately depict the lithologic properties of the strata surveyed. We have carefully investigated and correlated numerous instances of this kind, and, as a result of exhaustive study and experimentation, we believe that we have now found the solution to this problem and have discovered how to make adequate neutron logs of oil wells, and analogous sub-surface passages, in virtually all instances.

One of the facts which we have discovered is that prior workers have not, in making and interpreting their logs, taken into consideration the variation in scattering from point to point in the well of the primary gamma radiation emitted by the neutron source and detected by the ionization chamber along with the gamma radiation resulting from the neutron processes occurring in the strata. We have found that this is a very important factor.

The radium-beryllium source, which has been accepted as a standard neutron source by those working in the art, is composed of an alpha rayer in the form of radium, atomic number 88 and mass number 226, in secular equilibrium with its daughter products, intimately mixed with a target material, beryllium. The mixture is enclosed in a metallic capsule which in turn is surrounded by a lead shield made as thick as practical, the diameter of the wells to be logged being the limiting factor. The lead shield is used as an attenuator of gamma radiation which is emitted by the source mixture along with the neutrons. We have found, however, that such a source emits gamma radiation far in excess of that which we have found permissible in making uniformly good logs under various well conditions.

We have also investigated the effect of gamma rays naturally emitted by the strata penetrated by a well, and we have found that the ionizing processes which they cause to occur in the detector are ordinarily small in comparison with those occurring due to the primary radiation when a conventional source of neutrons sufficiently strong for satisfactory logging is used. Therefore, no further reference will be made to them in this application.

If radium, atomic number 88 and mass number 226, could be maintained in a pure state it would be ideally suited for use in a neutron source, because it does not emit gamma radiation which would be scattered by the formations and reach the detector. Radium, however, does not remain in a pure state for the reason that it is continually decaying to form daughter products, some of which are strong gamma rayers. Radium therefore goes into secular equilibrium with its daughter products. The nuclear processes which are continually taking place in radium are as follows:

Radium, atomic number 88 and mass number 226, is an alpha rayer which emits alpha rays of from 4 to 5 m. e. v. energy and in so doing decays to form radon, a gas. Radon also emits alpha radiation. The capsule in which the source material is contained retains this radon gas as it is formed and it goes to equilibrium. Radon is a powerful alpha rayer, giving off alpha rays of 6 m. e. v. energy. In emitting alpha rays of this energy it decays to radium A, which is also an alpha rayer. Radium A, by the emission of alpha radiation, decays to radium B. Radium B is a beta and a gamma rayer. The energy of the gamma radiation given off by radium B is approximately 2.1 m. e. v. Radium B decays into radium C which is, for the greater part, also a beta rayer and gamma rayer. The gamma radiation given off by radium C has an energy of about 1.8 m. e. v. 99.65% of radium C decays by the emission of beta radiation to form radium C', and the remaining 0.35% decays by the emission of both alpha and gamma rays to form radium C''. The energy of the gamma radiation given off in this reaction is approximately 1.8 m. e. v. Radium C', by the emission of alpha radiation, decays to form radium D, and radium C'', by the emission of beta radiation, also decays to form radium D. Radium D decays by the emission of beta and gamma radiation to form radium E. This gamma radiation is very soft, having an energy of only 0.047 m. e. v. Radium E, by the emission of beta radiation, decays to form radium F, and radium F in turn, by the emission of alpha radiation, decays to form lead, atomic number 82 and mass number 206, which is stable.

Since all of the elements between radium and lead are in secular equilibrium, it can be seen that there are present some daughter products which emit hard gamma radiation which cannot be greatly attenuated by a lead shield of practical dimensions which would fit into a well. Those hard gamma rays which are not absorbed by the shield enter the walls of the well and are scattered thereby and some of them reach the detector where they are detected.

The beta radiation emitted by certain of the above daughter products when stopped by a target material produces gamma rays of about 600,000 volts energy. This action is comparable to that of an X-ray tube, the stopping material being the target. The chances of stopping a beta ray to produce gamma rays are, however, small, about one in 1000, and we have found that this phenomenon is not of significant importance in the neutron logging process.

The nuclear reaction which occurs in the source capsule which produces fast neutrons is $_2He^4$ (alpha particles) + $_4Be^9$ (beryllium) ⟶

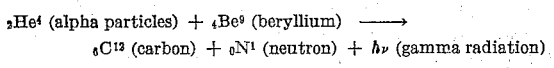

The neutrons produced by the above reaction have an average energy of approximately 5 m. e. v. For every neutron produced by the above reaction a photon of gamma radiation having an energy of approximately 3 m. e. v. is produced. Gamma radiation of this energy cannot be filtered with a practical amount of lead shield, commensurate with drill hole dimensions, to less than one gamma photon to four neutrons.

We have discovered that these last mentioned two sources of gamma radiation, viz., gamma rays produced by beta ray and alpha ray impingement on target material are weak enough to be tolerable in good neutron logging. The gamma radiation which we have discovered is not weak enough to be tolerable is that originating with the equilibrium mixture of the radium and its daughter products. To summarize, the significant gamma radiation emitted by the radium-beryllium source is, first, gamma radiation originating with the radium and its daughter products of approximately 2 m. e. v. energy, and, second, gamma radiation resulting from the nuclear reaction of the alpha rays and beryllium of approximately 3 m. e. v. The gamma rays given off by the radium and its daughter products are about 5000 times more numerous than the neutrons produced by the nuclear reaction of alpha rays and beryllium.

With a practical thickness of lead shield surrounding a radium-beryllium source, about 1000 of the gamma rays per neutron are emitted from the exterior of the shield. This gamma radiation is scattered by the formations in the vicinity of the source and some of the scattered radiation reaches the detector in varying amounts and is recorded, along with the desired gamma radiation produced by neutron reactions in the strata. In many cases, the scattered gamma radiation reaching the detector is substantially constant for all portions of the well. In these cases neutron logs can be made, as heretofore, with the radium-beryllium source, which are reliable and which truly correlate with the geology of the strata penetrated by the wells. This is due to the fact that the ionizing processes occurring in the detector which are produced by the scattered gamma rays are at a substantially constant rate resulting in a correspondingly constant flow of output current in the electrode circuit of the detector. Under these circumstances the ionizing processes in the detector produced by the desired gamma radiation resulting from neutron reactions in the strata, and which vary in rate in accordance with lithological characteristics of the strata, will be superimposed on those due to the scattered gamma radiation which originates in the neutron source. The output current from the detector then is composed of two components: one of substantially constant magnitude, that due to detected scattered gamma radiation, and one varying in magnitude in accordance with the lithological characteristics of the strata, that due to gamma radiation produced by neutron reactions occurring in the strata. Only in bore holes which behave as described above, prior to this invention, could a neutron log be made with a standard neutron source that accurately represented the lithological characteristics of the formations. There was no way of determining from the log itself before, during, or after the making of the log if the well was one of this type. This is a very important consideration, because frequently there is no way of knowing whether the log is or is not an accurate log.

Usually while logging with a radium-beryllium source the gamma radiation emitted by the source is scattered by the walls of the wells and reaches the detector in an amount which depends upon the size of the boring, the character of the rocks (largely density), the thickness of the casing, the density of fluid in the well, and possibly to a small extent upon other factors. Since these factors vary with depth in a manner which does not necessarily agree with, but is often opposite to, the properties of the formations which cause the neutron reactions, the result is to obscure, nullify, and often reverse the deflections of the log that are due to detected gamma rays which are produced by neutron reactions in the formations. In particular, all moderately small deflections are subject to suspicion since ordinarily it cannot be determined whether they are due to changes in the porosity or other factors affecting the neutron reactions in the formations or are due to slight changes in diameter of the well, density of the formations, etc. which change the amount of scattered gamma radiation.

Therefore it becomes apparent that the problem confronting those working in the art is to obtain a log while using a standard neutron source in which log the variations of the detected gamma radiation, resulting from neutron reactions occurring in the formations are sufficiently greater than the variations of detected scattered gamma radiation which originates with the neutron source, that the true lithological characteristics of the formations, as depicted by the gamma radiation resulting from the neutron reactions in the formation, will not be obscured. It is important that this problem be solved without resorting to the use of expensive or relatively rare neutron-producing reactant materials.

We have discovered that a neutron log, which accurately depicts the lithology of the formations traversed by a well, can be made in any well. We discovered and demonstrated that this can be accomplished by making a conventional neutron log while using a source of neutrons such as that described above; making a separate log while using a neutron-free source of gamma radiation, one which emits gamma radiation of the same intensity as the gamma radiation emitted by the neutron source; and then subtracting this second log from the conventional neutron log. The log thus obtained will represent the intensity of useful gamma radiation produced by neutron reactions in the formations versus depths.

The primary object of this invention is the provision of method and apparatus for producing neutron logs which accurately depict the lithological characteristics of the formations penetrated by bore holes. It is an object of this invention to provide a method and apparatus, comprising a source of neutrons, for obtaining a log of sub-surface formations which corresponds under virtually all conditions to neutron reactions occurring in the formations which are occasioned by neutrons emanating from the source. Still another object of this invention is the provision of method and apparatus whereby the unwanted effect produced by scattered gamma radiation, which has been united by the neutron source, can be eliminated from a neutron log. This invention further contemplates achieving the last recited object automatically as the log is made.

Other objects and advantages of the present invention will become apparent from the following detailed description when taken with the drawings, in which Figure 1 is a diagrammatic illustration of a neutron logging operation;

Figure 2 is an enlarged vertical sectional view of a sub-surface instrument;

Figures 3a to 3f are reproductions of sections of well logs made of a particular well from a depth of 2800 feet to 2980 feet under various conditions; and Figure 4 is a schematic diagram of a system whereby a subtraction log can be made automatically.

Referring to the drawings in detail, particularly Figure 1, there is illustrated a well surveying operation in which a fragment of the surface 10 of the earth is shown in vertical section. A well 11 penetrates the earth's surface and may or may not be cased. Disposed within the well is the sub-surface instrument 12 of the well logging system which additionally comprises a cable 13 for suspending the instrument in the well, a drum 14 from which cable is payed out or on which cable is wound when causing the capsule 12 to traverse the well, electrical connections from slip-rings on the axle of the drum 14 to an amplifier 15, which in turn is electrically connected to a recorder 16 in a conventional manner. Recorder 16 is driven through a transmission 17 by the drum 14 as the cable is payed out from or wound thereon. The record thus made by the recorder as the capsule 12 traverses the drill hole will be in correlation with depth.

As shown in Figure 2, the capsule 12 comprises a neutron source 18 forming the bottom portion thereof and a gamma-ray detecting system indicated generally as 19 which makes up the upper portion of the capsule. The gamma-ray detecting equipment 19 can be such as that disclosed in the Scherbatskoy et al. Patent No. 2,349,225 or such as that shown in the Scherbatskoy Patent No. 2,390,965. For purposes of describing this invention an ionization chamber 20 is shown as the radiation sensitive element. As disclosed in the Fearon Patent No. 2,308,361, the operation of a system of this character when producing a neutron log is that the capsule 12, made up of a source of neutrons 18 and a gamma-ray detection system 19, is caused to traverse a well. Neutrons emitted from the source enter the walls of the well and by nuclear reaction with matter contained in the walls, produce gamma radiation in amounts proportional to the lithological characteristics of the materials of which the walls are formed. These gamma rays produced by nuclear reactions in the strata are detected by the gamma-ray detector 20 by producing electrical signals that are related in magnitude to the intensity of the gamma radiation detected, and these signals are amplified by an amplifier 21 and transmitted over conductors contained in the cable 13 to the surface of the earth, where if necessary, they are further amplified by the amplifier 15 and recorded by the recorder 16 in correlation with the depth at which they were detected.

It is to be understood that any conventional well-logging gamma-ray detecting and recording system can be employed in conjunction with a proper neutron source while practising that form of the present invention in which a neutron log is made directly.

Commercially a log made by the above described operations is known as a neutron log. This is true although no neutrons were directly detected and recorded. In every instance to date the record has been one of gamma ray intensity versus depth. Those working in the art have heretofore assumed that such a log truly represents an effect produced in the strata by irradiating the strata with neutrons. That is, the log was purported to be a measurement of the gamma radiation produced by the nuclear reaction of neutrons and elements contained in the strata versus depth. Research, however, has shown that this is not the case. The log made by the commercial neutron logging method is a composite log that is produced by at least three, and possibly four, effects. These effects are:

1. Gamma radiation arising from the interaction of neutrons with substances in the strata.

2. Gamma radiation which has been emitted by the neutron source and, by a direct or indirect path, arrives at the detector.

3. An effect believed to be a neutron-proton or neutron-alpha reaction occurring in the detector as a result of neutrons travelling directly from the neutron-emitting source into the detector and there reacting with some substance in the detector.

4. An effect caused by natural gamma radiation emitted by the strata. The reason that reference is made to this fourth effect as being one that is possible is because normally it is so small in comparison to the other three effects that it can be considered in most instances negligible.

For a neutron log to truly depict the lithological characteristics of the strata penetrated by a well, the intensity of that component of gamma radiation arising from nuclear reactions occurring between the neutrons and elements in the strata must be sufficiently great that the effect produced by them in the detector will stand out above the other three effects enumerated above. The most troublesome of the three unwanted effects is that produced in the detector by gamma radiation which has been emitted by the neutron source and which has reached the detector after having been scattered by the strata surrounding the drill hole. As pointed out above, scattering of this primary gamma radiation is not uniform in all wells, nor can its variation be predicted from well to well since it is dependent upon the variation in the diameter of the well, the density of the strata penetrated by the well, the type of fluid in the well, and possibly to a small extent on other factors. By far the most important of these is the variation in well diameter. This will become apparent from the following discussion of Figures 3a to f inclusive.

In Figure 3 there are reproduced sections of logs made of a particular well from a depth of 2800 feet to a depth of 2980 feet. Figure 3a is a standard neutron log; that is, it is a log which has been made while using the "so-called" standard neutron source. The log has been duplicated so that random variations which are statistical in nature may be observed. The insert curve A is a record of the random variation which has been made with the detecting instrument stationary. The sharp breaks occurring in this insert fragment of a trace are believed to be attributable to ionizing processes occurring in the detecting instrument as a result of neutron-proton reactions therein. The frequency of occurrence of this effect is believed to vary approximately inversely as the square of the distance between the source and the effective portion of the detecting instrument. This random effect is clearly discernible in the two logs of Figure 3a if a close comparison is made of the logs. The well in which the two logs of Figure 3a were made was of substantially uniform diameter over the distance logged. Therefore the variation in gamma radiation which was emitted by the neutron source and which had been scattered by the strata was substantially negligible. As a result, the two standard neutron logs depict with a fair degree of accuracy the lithological characteristics of the strata in the well. In order to determine the effect of gamma rays which were emitted by the neutron source and scattered by the strata lining the well a log was made of the same portion of the well while using a neutron-free gamma-ray source which emitted gamma radiation of the same intensity as those emitted by the standard neutron source. This log is shown in Figure 3b. It will be noted that the variation of detected scattered gamma radiation is substantially negligible. However, from this log it is safe to assume that the two logs shown in Figure 3a are of gamma rays produced by neutron reactions in the strata versus depth.

In order to show the variation in the effect produced by gamma radiation which has been scattered by the formations and has reached the detecting instrument, the same well, logs of which are shown in Figures 3a and 3b, was shot with nitro-glycerine. A caliper log was then made of that portion of the well between the depths of 2800 feet and 2980 feet. This caliper log is shown in Figure 3c. It is apparent from this log that enormous cavities were created in the well and the inner walls thereof are anything but smooth. The diameter of the hole varies over a wide range. After the well had been shot a standard neutron log was again made. By separate operations this log was duplicated. The two logs are shown in Figure 3d. By comparing these two logs to those shown in Figure 3a it will be seen that they in no way resemble each other. All parameters other than the diameter of the drill hole remained constant when the logs of Figures 3a and 3d were made. This clearly illustrates the effect of the variation in well diameter on the standard neutron log. Although the effect of enormous changes in well diameter are illustrated by these logs, it has been found that variations of more than ½" in well diameter will produce variations in the standard neutron log which would lead to erroneous interpretation. Now compare the logs shown in Figure 3e to those shown in Figure 3d. The two logs shown in Figure 3e are logs which have been made while using a neutron-free gamma-ray source, the gamma rays emitted from which were of the same intensity as those emitted by the standard neutron source. At a glance these logs appear to be duplicates. This is because the effect of scattered gamma radiation which has been emitted by the source has varied widely with the hole diameter. In fact, the logs made with the neutron-free gamma-ray source correlate with the caliper log. The log of Figure 3e could be said to truly represent the variation in detected scattered gamma radiation which was emitted by the gamma-ray source. Since the variation of detected scattered gamma radiation is for the greater part attributable to the variation in well diameter, if one subtracts the logs made while using a neutron-free gamma-ray source from those used by the standard neutron source, a log should be obtained which would truly represent a measure of the gamma radiation produced by neutron reactions in the strata versus depth. This has been done. The result is illustrated in Figure 3f. A comparison of the log of Figure 3f with the log shown in Figure 3a will show that they closely correlate. Therefore, it becomes apparent that if one desires to make a neutron log which truly depicts the lithological characteristics of the strata penetrated by a well, the effect of gamma radiation given off by the neutron source, scattered by the strata and thereafter reached the detector must be taken into consideration. For as clearly illustrated above in Figures 3a to 3f, in wells where the diameter varies from point to point in depth, the effect of the detected scattered gamma radiation is to obscure, nullify and even reverse the deflections of the log that are due to detected gamma rays which are produced by neutron reactions in the formations.

As pointed out above a solution to the problem presented by the effect of scattered primary gamma radiation, originating with the neutron source, is to make a standard neutron log, such as that accepted commercially as standard by those working in the art; then making a separate log while using a neutron-free source of gamma radiation, one which emits gamma radiation of the same intensity as the gamma radiation emitted by the standard neutron source; and then subtracting this log from the standard neutron log. The log so obtained will represent the intensity of gamma radiation produced by neutron reactions occurring in the formations and will depict the lithological characteristics of the strata penetrated by the well.

Apparatus by means of which the two logs can be made by separate operations are known in the art, for example, see patents to Bender No.

2,133,766 and Fearon No. 2,308,361. The operation of subtracting two such logs can be carried out on a drawing board with a fair degree of accuracy. Although this apparatus has been known for many years neither the inventors nor anyone else saw a relationship between such logs. Such a relationship is not an obvious one. It was only by careful research involving the study of many commercial logs and well geology that this relationship was discovered.

A subtraction log such as that described above can be obtained by a single operation by the apparatus illustrated diagrammatically in Figure 4. Referring to this figure, there is shown a well 22 provided with a casing 23. For purposes of the present invention the casing 23 is included for purpose of illustrating that the method can also be practised in cased wells. There is shown disposed within the casing of the well 22 a first capsule 24 and a second capsule 25. Capsules 24 and 25 are connected by separate conductors 26 and 27, respectively, to the recording apparatus on the surface. These conductors, which may form a supporting cable, pass over a pulley 28 to a drum 29 on which they are wound and from which they are payed out as the capsules are caused to traverse the well 22. Capsules 24 and 25 are secured together in vertical spaced relationship by means such as a cable 30 so that they will at all times maintain a fixed vertical spaced relationship with each other.

The end of drum 29 is supplied with slip-rings 31 which are connected to the conductors 26 leading from the capsule 24. A second pair of slip-rings 32 are connected to the conductors 27 leading from capsule 25. Each pair of slip-rings is provided with appropriate brushes as shown. Slip-rings 32 are connected by means of brushes to conductors 33 leading to the amplifier 34. The slip-rings 31 are connected through the brushes shown to conductors 35 which lead to the amplifier 36. The output of amplifier 34 is connected by means of conductors 37 to a magnetic stylus 38 which is adapted to magnetically impress signals from the amplifier 34 on a moving wire or tape 39. The wire or tape 39 is here illustrated as being endless and passes around the pulleys 40, 41 and 42, pulley 42 being the driving pulley and is driven by shafts 43 and 44 and pulley 28 through a speed changing transmission 45. The wire or tape 39 is driven in the direction indicated by arrows on the diagram. The speed at which the wire or tape 39 is driven is related to the speed at which the capsules 24 and 25 traverse the well 22 and is so controlled that a point on the wire or tape 39 directly under the recording stylus 38 will move to a point under a pick-up stylus 46 during the time required for the capsules 24 and 25 to move upwardly in the well 22 a distance corresponding to the spacing between the two capsules. The stylus 46 picks up the signals impressed magnetically on the wire or tape 39 and conducts them through the variable resistance 47 by means of conductors 48, 49 and 50 to one-half, 51, of a fixed resistance. Signal current flowing through that portion 51 of the fixed resistance will produce a proportional IR drop. At the same time that the stylus 46 picks up the signals from the moving tape or wire 39 signals are being produced by the trailing capsule 25 at a point adjacent the wall of the well at which those signals being picked up by the stylus 46 originated. The signals from the trailing capsule are amplified by the amplifier 36 and conducted by means of conductors 52, 53 and 54 through a variable resistance 55 to a second half 56 of the fixed resistor. The signal current flowing in this circuit will produce an IR drop across this portion 56 of the fixed resistor. By properly connecting the conductors across the halves 51 and 56 of the fixed resistance, like signals can be made to have opposite polarity so that they will cancel each other at this point in the circuit. The result is, in effect, a subtraction of one group of signals from a group of signals which contains the same signals as one of its components. The resultant signal is impressed by means of conductors 57 on an appropriate recorder. For purpose of illustration, a simple form of recorder is shown. The recorder shown is of the moving coil or loop type galvanometer. This form of recorder is well known in the art. Light from a source 58 is reflected from a mirror 59 carried by the loop or coil 60 on to a moving recorder strip 61. Recorder strip 61 is driven by the pulley 28 through shafts 44, 43, 62 and 63 through the speed changing transmissions 45 and 64. With such an arrangement the speed of the recorder strip will be in correlation with the depth at which signals are detected. Therefore, the resultant record would be a well log, in that it represents geological characteristics of the strata penetrated by the well versus depth.

It is to be understood that one of the capsules 24, for example, contains a neutron source such as that defined above as a standard source and a gamma-ray detecting system, and the other capsule 25 contains a neutron-free gamma-ray source and a gamma-ray detecting system. Under such conditions while using the recording apparatus in the manner described above, the capsules would traverse the well in an upward direction while the log is being recorded. The electrical signals corresponding to gamma rays detected by the gamma-ray detecting system in the capsule 24 would be transmitted to the moving wire or tape and there recorded magnetically. These signals would be stored by the tape until the capsule 25 had moved upwardly to the point which was occupied by the capsule 24 at which time signals detected by the gamma-ray detecting system in capsule 25 would be communicated to that portion 56 of the fixed resistor in the recorder circuit while simultaneously the signals stored on the magnetic tape or wire 39 would be picked up by the stylus 46 and conducted to the other half 51 of the fixed resistor in the recording circuit. Like signal currents flowing through the two halves of this fixed resistor would, due to a difference in polarity, effect a subtraction by cancelling each other from the composite signals produced by the detecting system in capsule 24 and the resultant signals would be impressed on the recorder in the manner described.

It is obvious that if one wished to make the subtraction log while traversing the well in the opposite direction with the capsules 24 and 25 that it is only necessary to switch the connections to the amplifiers 34 and 36 leading from the brushes on the slip-rings 31 and 32, the only requirement being that the signals stored on the moving tape or wire 39 must be from the leading detector.

We claim:

1. A method of neutron logging a drill hole that comprises irradiating the formations penetrated by the drill hole with mixed radiation consisting of neutrons and gamma rays which are emitted by a common source, simultaneously irradiating the formations penetrated by the drill hole with neutron-free gamma radiation of the same intensity and hardness as the gamma radiation emitted by the source of mixed radiation, separately detecting gamma radiation influenced by the mixed radiation and gamma radiation which originated with the neutron-free gamma ray source and was scattered by the formations, subtracting the latter detected radiation from the first detected radiation and recording the result in correlation with depth of the drill hole at which detection occurred.

2. A method of making a neutron log of a drill hole that comprises irradiating the formations penetrated by the drill hole with mixed radiation consisting of neutrons and gamma rays which are emitted by a common source, simultaneously detecting gamma radiation produced by the interaction of neutrons in the formations and gamma radiation which has originated with the source of mixed radiation, eliminating from the detected gamma radiation the component of detected gamma radiation that has been emitted by the source of mixed radiation and scattered by the formations, and recording the remaining component of detected gamma radiation.

3. A method of making a neutron log of a drill hole that comprises irradiating the formations penetrated by the drill hole with mixed radiation consisting of neutrons and gamma rays which are emitted by a common source, simultaneously detecting gamma radiation produced by the interaction of neutrons in the formations and gamma radiation which has originated with the source of mixed radiation, irradiating the formations with gamma radiation which has been emitted by a separate source, said gamma radiation having the same energy and intensity as that emitted by the source of mixed radiation, detecting the radiation from the gamma radiation source after it has been scattered by the formations, causing said last detected gamma radiation to cancel a component of the first detected gamma radiation and recording the remaining detected gamma radiation to effect a neutron log which represents the gamma radiation produced by neutron interactions in the formations.

4. A method of making a neutron log of a drill hole that comprises irradiating the formations penetrated by the drill hole with mixed radiation consisting of neutrons and gamma rays which are emitted by a common source, simultaneously detecting gamma radiation produced by the interaction of neutrons in the formations and gamma radiation which has originated with the source of mixed radiation, subtracting from the detected gamma radiation a component that is equal to the component produced by the gamma radiation which originated with the source and was scattered by the formations, and recording the resultant detected radiation thereby producing a log which represents gamma radiation produced in the formations by the interaction of neutrons.

5. A method of making a neutron log of a drill hole that comprises irradiating the formations penetrated by the drill hole with mixed radiation consisting of neutrons and gamma rays, detecting gamma radiation influenced by the mixed radiation in the formations by producing an electrical current proportional thereto, simultaneously producing an electrical current that is equal to that component of detection current that is attributable to gamma radiation which has been scattered by the formations and entered the detector, subtracting the second produced current from the detection current and recording the resultant current as a measure of the detected gamma radiation that was produced by neutron interactions in the formations.

6. A method of making a neutron log of a drill hole that comprises traversing the drill hole with a source of mixed radiation to irradiate the formations with gamma radiation and neutrons, simultaneously traversing the drill hole with a neutron-free source of gamma radiation that is spaced from the mixed source of radiation to irradiate the formations with gamma radiation having the energy and intensity of the gamma radiation emitted by the mixed source of radiation, simultaneously and separately at spaced points detecting gamma radiation influenced by the mixed source of radiation and gamma radiation which has originated with the neutron-free gamma ray source by producing electrical currents respectively proportional to the radiation detected, storing the current produced by one of the detectors until the other detector is adjacent the formation where the stored detector current was produced, reproducing the stored current, subtracting one current from the other and recording the resultant current.

7. An apparatus for producing a neutron log of a drill hole a source of mixed radiation, said radiation consisting of neutrons and gamma radiation, a gamma radiation detector adapted to detect gamma radiation influenced by the mixed radiation from said source, a second source of radiation, the radiation emitted by said second source being gamma radiation of the same hardness and intensity as the gamma radiation emitted by the source of mixed radiation, a second gamma radiation detector adapted to detect gamma radiation influenced by the second source of radiation, means for subtracting the effect produced in the second detector from the effect produced in the first detector, and means for recording the result in correlation with the depth of the detectors.

8. An apparatus for producing a neutron log of a drill hole a radium-beryllium source of radiation that adapted to irradiate the formations penetrated by the drill hole with neutrons and gamma radiation when traversed thereby, a detector of gamma radiation spaced from said source but adapted to move therewith, said detector being adapted to detect gamma radiation influenced by the irradiation of the formations with the gamma radiation and neutrons emitted by said source, a second radiation source, said second source being adapted to emit gamma radiation of the same hardness and intensity as the gamma radiation emitted by the first source, a detector spaced from but adapted to move with said second source, said second detector being adapted to detect gamma radiation influenced by the formations when traversed therewith, means for automatically subtracting the effect produced in the second detector by the radiation from the formations from the effect produced in the first detector by the radiation from the same respective formations, and means for recording the resultant effect as a measure of the detected gamma radiation produced by neutron interactions in the formations.

9. An apparatus for making a neutron log of a drill hole that comprises common means for irradiating the formations in situ with gamma radiation and neutrons, separate means for irradiating the formations in situ with gamma radiation having the same intensity and hardness as the gamma radiation emitted by the first means, separate detecting means for detecting gamma radiation influenced by the formations when irradiated with the common radiating means and the separate radiating means, means for taking the difference between the effects produced in the two detecting means, and means for recording this difference as a measure of the neutron interactions in the formations.

GILBERT SWIFT.
    ROBERT E. FEARON.
    JEAN M. THAYER.

REFERENCES CITED

The following references are of record in the file of this patent:

UNITED STATES PATENTS

| Number | Name | Date |
|---|---|---|
| 2,475,137 | Herzog | July 5, 1949 |